United States Patent
Deo et al.

(10) Patent No.: US 11,846,973 B1
(45) Date of Patent: Dec. 19, 2023

(54) SYSTEMS AND METHODS FOR CONTEXT-DEPENDENT MULTICORE INTERRUPT FACILITATION

(71) Applicant: Cirrus Logic International Semiconductor Ltd., Edinburgh (GB)

(72) Inventors: Sachin Deo, Austin, TX (US); Younes Djadi, Austin, TX (US); Nariankadu D. Hemkumar, Austin, TX (US); Junsong Li, Austin, TX (US); Wai-Shun Shum, Austin, TX (US); Franz Weller, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 17/982,916

(22) Filed: Nov. 8, 2022

(51) Int. Cl.
  *G06F 13/10* (2006.01)
  *G06F 13/24* (2006.01)
(52) U.S. Cl.
  CPC ............ *G06F 13/24* (2013.01); *G06F 13/102* (2013.01)

(58) Field of Classification Search
  None
  See application file for complete search history.

(56) References Cited

U.S. PATENT DOCUMENTS

2017/0060800 A1* 3/2017 Watkins ................ G06F 13/105

* cited by examiner

*Primary Examiner* — Scott C Sun
(74) *Attorney, Agent, or Firm* — Jackson Walker L.L.P

(57) ABSTRACT

A multicore processor may include a plurality of cores including at least a first core and a second core, a shared peripheral comprising a plurality of interrupt register banks including at least a first interrupt register bank dedicated to the first core and a second interrupt register bank dedicated to the second core, and a plurality of communications bridges, including at least a first bridge interfaced between the first core and the shared peripheral and at least a second bridge interfaced between the second core and the shared peripheral. The first core may be configured to program the first interrupt register bank via the first bridge to configure the shared peripheral for access by the first core. The second core may be configured to program the second interrupt register bank via the second bridge to configure the shared peripheral for access by the second core.

16 Claims, 4 Drawing Sheets

SYSTEMS AND METHODS FOR CONTEXT-DEPENDENT MULTICORE INTERRUPT FACILITATION

FIELD OF DISCLOSURE

The present disclosure relates in general to circuits for electronic devices, including without limitation personal portable devices such as wireless telephones and media players, and more specifically, systems and methods for context-dependent interrupt facilitation in a multicore processing device.

BACKGROUND

Many mobile devices (e.g., mobile phones) include one or more cameras for capturing images. To provide for image stabilization and focus, a position of a camera within a plane substantially parallel to a subject of an image as well as a position of a lens of the camera in a direction perpendicular to such plane, may be controlled by a plurality of motors under the control of a camera controller. A control system may be implemented using an applications processor of the mobile device coupled via a communication interface (e.g., an Inter-Integrated Circuit or I2C interface) to a camera controller local to the camera and its various motors. For example, the applications processor may communicate to the camera controller a vector of data regarding a target position for an applications processor, whereas the camera controller may communicate to the applications processor a vector regarding an actual position of the camera, as sensed by a plurality of magnetic sensors (e.g., Hall sensors) and/or other appropriate sensors.

As mobile devices become more sophisticated, so too is camera control on such mobile devices. Accordingly, camera controllers are increasingly being implemented using multicore processors that may include, on a single integrated circuit, a plurality of processing cores and a plurality of peripheral blocks. In such a multicore processor, there may be multiple processes running on different cores that may consume data or context from a peripheral block or may run on different execution contexts provided by a peripheral block.

In an embedded multicore system, there may exist static, serial, and/or joint ownership of processing and/or data from peripheral blocks, which may present a number of challenges. One challenge in an embedded multicore system is that access to a peripheral block not designated to be in a core's domain will incur the risk of communications bus collisions/overheads and/or communications bus stalls by such core.

A second challenge is that while interrupt request lines may be mapped to different cores on a multicore processor, a mechanism may be required for each core to individually enable/disable or clear/set interrupts based on the channel readiness or associated error conditions. For example, in a particular use case, a data-ready interrupt from a sensor channel may be required by a first core for processing control math while a voltage-related interrupt may be required by a second core to perform signal compensation associated with a voltage level. Each of the two cores may also need to access the interrupt registers without colliding with writes by the other core.

A third challenge may be context-awareness. In addition to the duplication of interrupt request registers for access by the individual cores, a peripheral block must also be able to detect the context for the interrupt generation. An individual core may need to have the capability to enable/disable interrupts based on the types of transfer over a communication link, also known as endpoints. The interrupts based on the endpoints provide execution context, and a core must be able to configure and schedule a task associated with that endpoint.

SUMMARY

In accordance with the teachings of the present disclosure, certain disadvantages and problems associated with existing approaches to implementing multicore systems may be reduced or eliminated.

In accordance with embodiments of the present disclosure, a multicore processor may include a plurality of cores including at least a first core and a second core, a shared peripheral comprising a plurality of interrupt register banks including at least a first interrupt register bank dedicated to the first core and a second interrupt register bank dedicated to the second core, and a plurality of communications bridges, including at least a first bridge interfaced between the first core and the shared peripheral and at least a second bridge interfaced between the second core and the shared peripheral. The first core may be configured to program the first interrupt register bank via the first bridge to configure the shared peripheral for access by the first core. The second core may be configured to program the second interrupt register bank via the second bridge to configure the shared peripheral for access by the second core.

In accordance with these and other embodiments of the present disclosure, a method may be provided for a multicore processor having a plurality of cores including at least a first core and a second core, a shared peripheral comprising a plurality of interrupt register banks including at least a first interrupt register bank dedicated to the first core and a second interrupt register bank dedicated to the second core, and a plurality of communications bridges, including at least a first bridge interfaced between the first core and the shared peripheral and at least a second bridge interfaced between the second core and the shared peripheral. The method may include configuring the first core to program the first interrupt register bank via the first bridge to configure the shared peripheral for access by the first core and configuring the second core to program the second interrupt register bank via the second bridge to configure the shared peripheral for access by the second core.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

Figure 1:
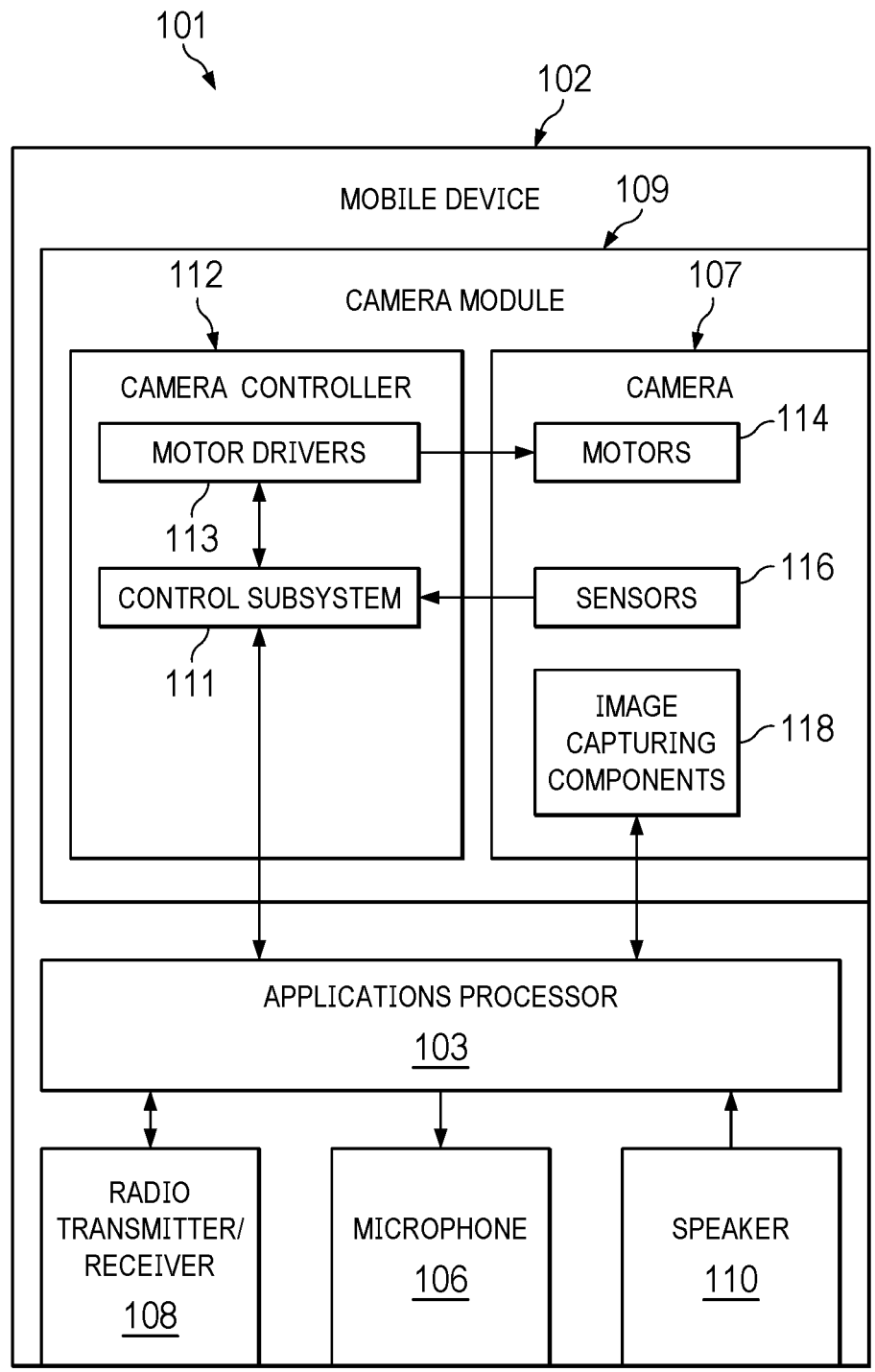
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, an applications processor 103, a microphone 106, a radio transmitter/receiver 108, a speaker 110, and a camera module 109 comprising a camera 107 and a camera controller 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Applications processor 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (not explicitly shown) and/or other computer-readable media accessible to applications processor 103.

Microphone 106 may be housed at least partially within enclosure 101, may be communicatively coupled to applications processor 103, and may comprise any system, device, or apparatus configured to convert sound incident at microphone 106 to an electrical signal that may be processed by applications processor 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to applications processor 103, and may include any system, device, or apparatus configured to, with the aid of an antenna, generate and transmit radio-frequency signals as well as receive radio-frequency signals and convert the information carried by such received signals into a form usable by applications processor 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

Speaker 110 may be housed at least partially within enclosure 101 or may be external to enclosure 101, may be communicatively coupled to applications processor 103, and may comprise any system, device, or apparatus configured to produce sound in response to electrical audio signal input. In some embodiments, speaker 110 may comprise a dynamic loudspeaker, which employs a lightweight diaphragm mechanically coupled to a rigid frame via a flexible suspension that constrains a voice coil to move axially through a magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Camera 107 may be housed at least partially within enclosure 101 (and partially outside of enclosure 101, to enable light to enter a lens of camera 107), and may include any suitable system, device, or apparatus for recording images (moving or still) into one or more electrical signals that may be processed by applications processor 103. As shown in FIG. 1, camera 107 may include a plurality of motors 114, sensors 116, and image capturing components 118.

Image capturing components 118 may include a collection of components configured to capture an image, including without limitation one or more lenses and image sensors for sensing intensities and wavelengths of received light. Such image capturing components 118 may be coupled to applications processor 103 such that camera 107 may communicate captured images to applications processor 103.

Motors 114 may be mechanically coupled to one or more of image capturing components 118, and each motor 114 may include any suitable system, device, or apparatus configured to, based on control signals received from camera controller 112 indicative of a desired camera position, cause mechanical motion of such one or more image capturing components 118 to a desired camera position.

Sensors 116 may be mechanically coupled to one or more of image capturing components 118 and/or motors 114 and may be configured to sense a position associated with camera 107. For example, a first sensor 116 may sense a first position (e.g., x-position) of camera 107 with respect to a first linear direction, a second sensor 116 may sense a second position (e.g., y-position) of camera 107 with respect to a second linear direction normal to the first linear direction, and a third sensor 116 may sense a third position (e.g., z-position) of camera 107 (e.g., position of lens) with respect to a third linear direction normal to the first linear direction and the second linear direction.

Camera controller 112 may be housed within enclosure 101, may be communicatively coupled to camera 107 and applications processor 103 (e.g., via an Inter-Integrated Circuit (I2C) interface), and may include any system, device, or apparatus configured to control motors 114 or other components of camera 107 to place components of camera 107 into a desired position. Camera controller 112 may also be configured to receive signals from sensors 116 regarding an actual position of camera 107 and/or regarding a status of camera 107. As shown in FIG. 1, camera controller 112 may include a control subsystem 111 and motor drivers 113.

Control subsystem 111 may be integral to camera controller 112, and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, control subsystem 111 may interpret and/or execute program instructions and/or process data stored in a memory and/or other computer-readable media accessible to control subsystem 111. Specifically, control subsystem 111 may be configured to perform functionality of camera controller 112, including but not limited to control of motors 114 and receipt and processing of data from sensors 116. In some embodiments, control subsystem 111 may comprise a multicore processor.

Motor drivers 113 may comprise a plurality of circuits, each such circuit configured to receive one or more control signals from control subsystem 111 (including without limitation a signal indicative of a desired target current for a motor 114) and drive a driving signal (e.g., a current-mode signal) to a respective motor 114 in accordance with the one or more control signals in order to control operation of such respective motor 114.

Figure 2:
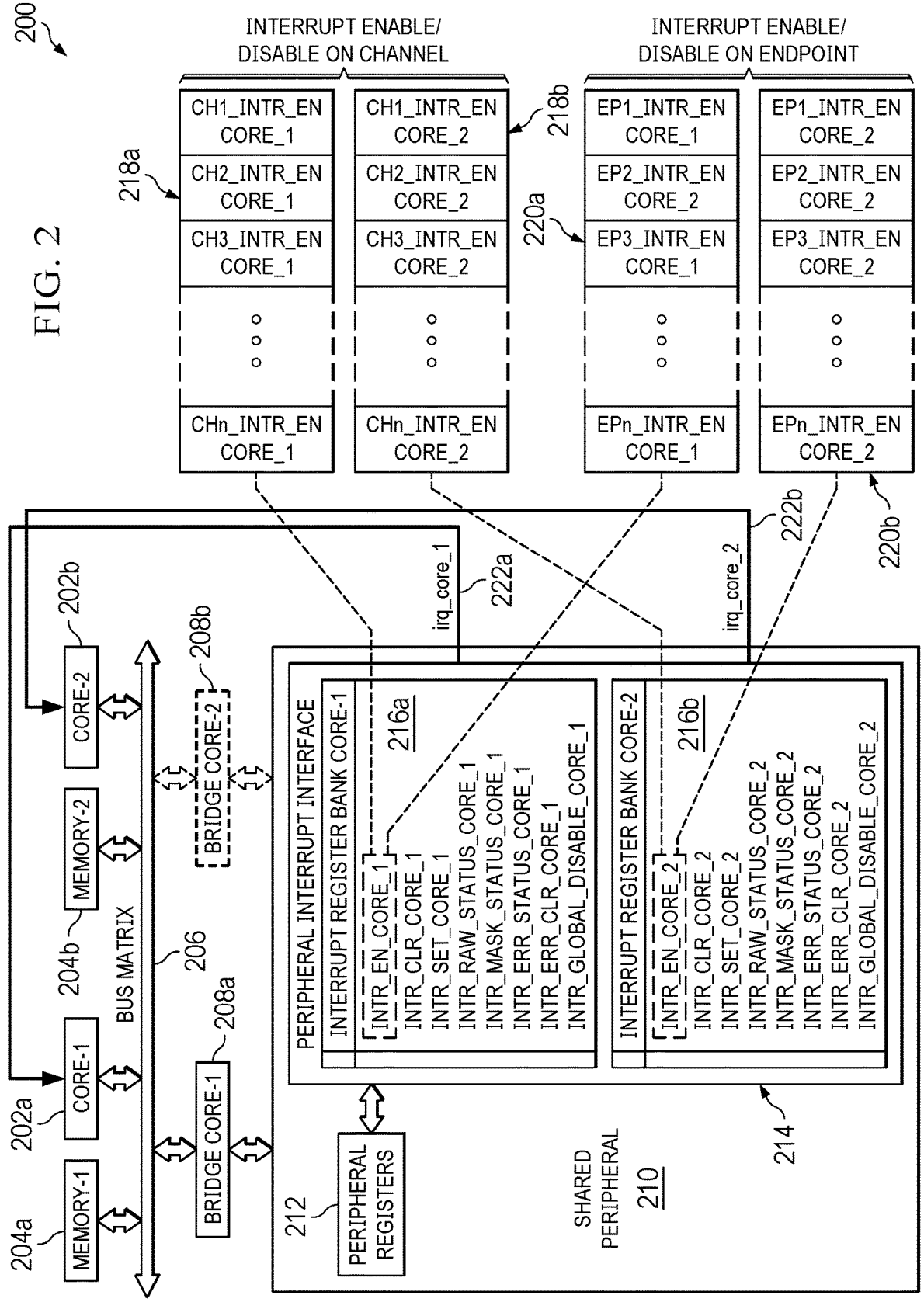
FIG. 2 illustrates a block diagram of selected components of an example multicore processor which may be used to implement a control subsystem of a camera controller, in accordance with embodiments of the present disclosure.

FIG. 2 illustrates a block diagram of selected components of an example multicore processor 200 which may be used to implement control subsystem 111 of camera controller 112, in accordance with embodiments of the present disclosure. As shown in FIG. 2, multicore processor 200 may include a plurality of cores 202 including cores 202a and 202b, a memory 204 (e.g., memories 204a and 204a), a bus matrix 206, a plurality of bridges 208 including bridges 208a and 208b each dedicated to a respective core 202, a shared peripheral 210, and a plurality of interrupt request lines 222 including interrupt request lines 222a and 222b each dedicated to a respective core 202. Although FIG. 2 depicts only a single shared peripheral 210 for the purposes of clarity and exposition, it is understood that multicore processor 200 may include a plurality of shared peripherals 210.

Each core 202 may comprise a separate processing unit, which may read and execute program instructions, such that multicore processor 200 may execute instructions on multiple cores 202 at the same time, which may increase overall execution speed for programs of instructions that support multithreading or other parallel computing techniques. In some embodiments, a core 202 may interpret and/or execute program instructions and/or process data stored in one or more memories 204 and/or another component of multicore processor 200.

A memory 204 may be communicatively coupled to cores 202 via bus matrix 206 and may include any system, device, or apparatus configured to retain program instructions and/or data for a period of time (e.g., computer-readable media). A memory 204 may include RAM, EEPROM, a PCMCIA card, flash memory, magnetic storage, opto-magnetic storage, or any suitable selection and/or array of volatile or non-volatile memory.

Bus matrix 206 may include any suitable communications bus for communicatively coupling cores 202, memories 204, and bridges 208 to one another. In some embodiments, bus matrix 206 may comprise an Advanced High-performance Bus (AHB) in accordance with the Advanced Microcontroller Bus Architecture specification.

A bridge 208 may comprise a peripheral bus interface configured to communicatively couple shared peripheral 210 to a core 202 via bus matrix 206. In particular, each bridge 208 may be dedicated to a specific core 202, for example such that bridge 208a is dedicated to bus communication between core 202a and shared peripheral 210 and bridge 208b is dedicated to bus communication between core 202b and shared peripheral 210. Accordingly, by using a bridge 208, a core 202 may access features of shared peripheral 210, for example register interfaces of peripheral registers 212 of shared peripheral 210. In some embodiments, a bridge 208 may comprise an Advanced Peripheral Bus (APB) in accordance with the Advanced Microcontroller Bus Architecture specification.

Shared peripheral 210 may include any auxiliary block of multicore processor 200 that may receive information from cores 202 and transmit information from cores 202. For example, shared peripheral 210 may in effect comprise an input/output interface of multicore processor 200 that may interface with components external to multicore processor 200, for example motors 114, sensors 116, and/or applications processor 103. As shown in FIG. 2, shared peripheral 210 may include peripheral registers 212 and a peripheral interrupt interface 214.

Peripheral registers 212 may comprise a memory local to shared peripheral 210 for storing any relevant data and/or metadata concerning access of shared peripheral 210 by cores 202.

Peripheral interrupt interface 214 may comprise any suitable interface for configuration of interrupt processing for interrupt requests from shared peripheral 210 to cores 202, and may comprise a plurality of interrupt register banks 216 including interrupt register banks 216a and 216b each dedicated to a respective core 202. Each interrupt register bank 216 may include, for its respective core 202, a static interrupt configuration 218 for enabling and disabling of channel-data-based interrupts and a statically-configured but dynamically-triggered interrupt configuration 220 for enabling and disabling of endpoint-based interrupts. In other words, interrupt register bank 216a may include a static interrupt configuration 218a for enabling and disabling of channel-data-based interrupts and a statically-configured but dynamically-triggered interrupt configuration 220a for enabling and disabling of endpoint-based interrupts for core 202a, while interrupt register bank 216b may include a static interrupt configuration 218b for enabling and disabling of channel-data-based interrupts and a statically-configured but dynamically-triggered interrupt configuration 220b for enabling and disabling of endpoint-based interrupts for core 202b.

For example, each core 202 may individually enable, by programming appropriate registers of such core's associated static interrupt configuration 218, channel-data-ready interrupts for available channels. Duplication of interrupt registers for each core 202 may allow each core 202 to select which channels interrupt such core 202.

As another example, each core 202 may individually enable, by programming appropriate registers of such core's associated interrupt configuration 220, endpoint-based interrupts. Endpoint communications hardware may dynamically detect an endpoint (i.e., transfer type) embedded in a communication packet and generate an interrupt request to each core 202 that has enabled interrupts for such endpoint.

In addition, as shown in FIG. 2, based on interrupt configuration settings, shared interrupt interface 214 may map dedicated interrupt request lines 222 to each core 202.

Further, based on interrupt configuration settings, shared interrupt interface 214 may allow for dynamic reassignment of interrupts from one core 202 to a subset of one or more other cores 202 in order to efficiently load balance depending on a configuration control mode.

Accordingly, the architecture of multicore processor 200 shown in FIG. 2 and described above may provide for:

Mapping of each of a plurality of interrupt request lines 222, with each interrupt request line 222 dedicated to a corresponding core 202;

A plurality of interrupt register banks 216 for access and configuration by a plurality of cores 202, with each interrupt register bank 216 dedicated to a corresponding core 202;

Interrupt register banks 216 may include a static interrupt configuration 218 for enabling and disabling of channel-data-based interrupts for its respective core 202;

Interrupt register banks 216 may include a statically-configured but dynamically-triggered interrupt configuration 220 for enabling and disabling of endpoint-based interrupts for its respective core 202; and A plurality of bridges 208, with each bridge 208 dedicated to a corresponding core 202.

Figure 3A:
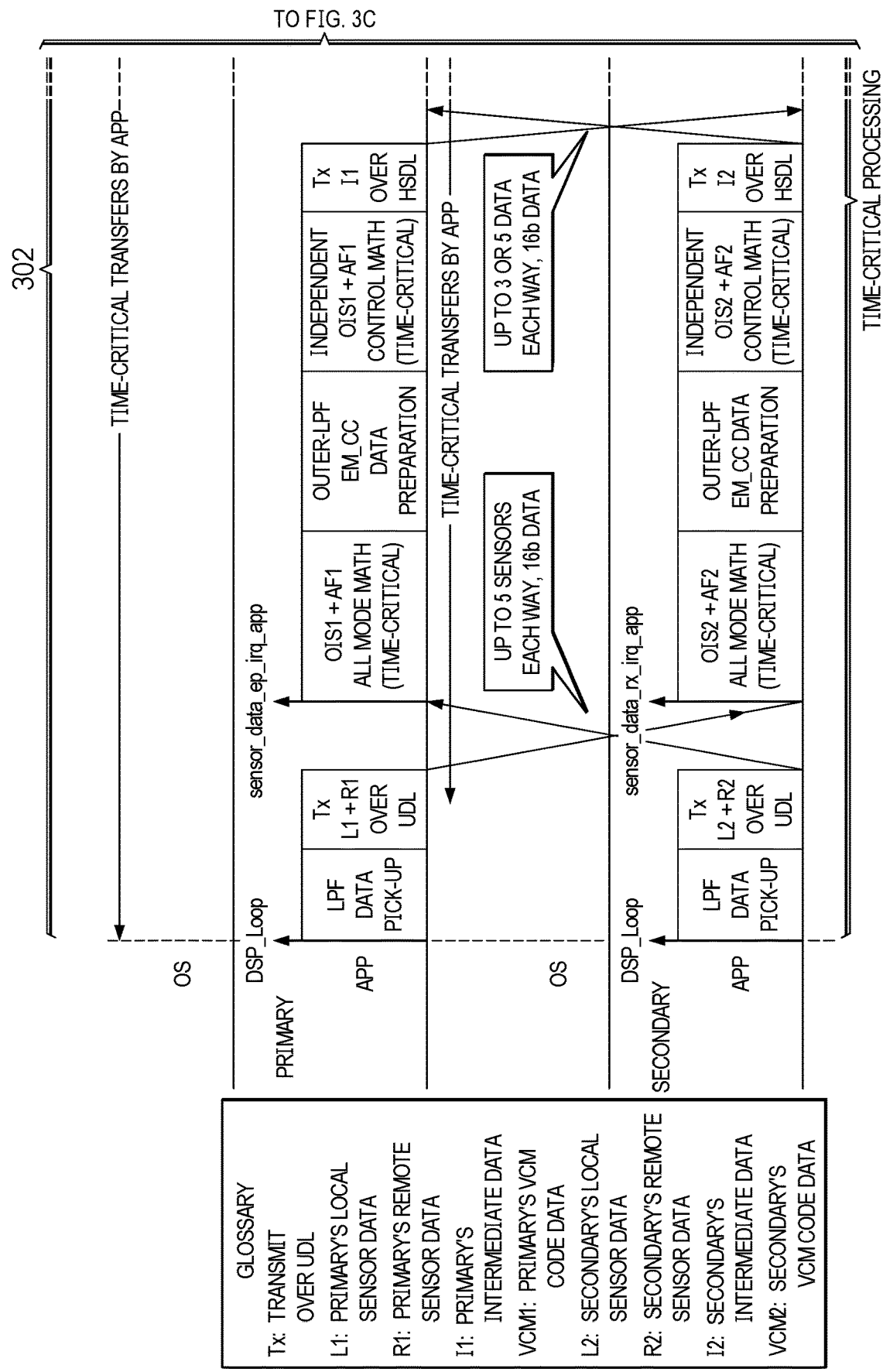
FIGS. 3A and 3B (which may be referred to collectively as "FIG. 3" herein) illustrate a timing diagram for time-partitioning of communications transfers, in accordance with embodiments of the present disclosure.
Figure 3B:
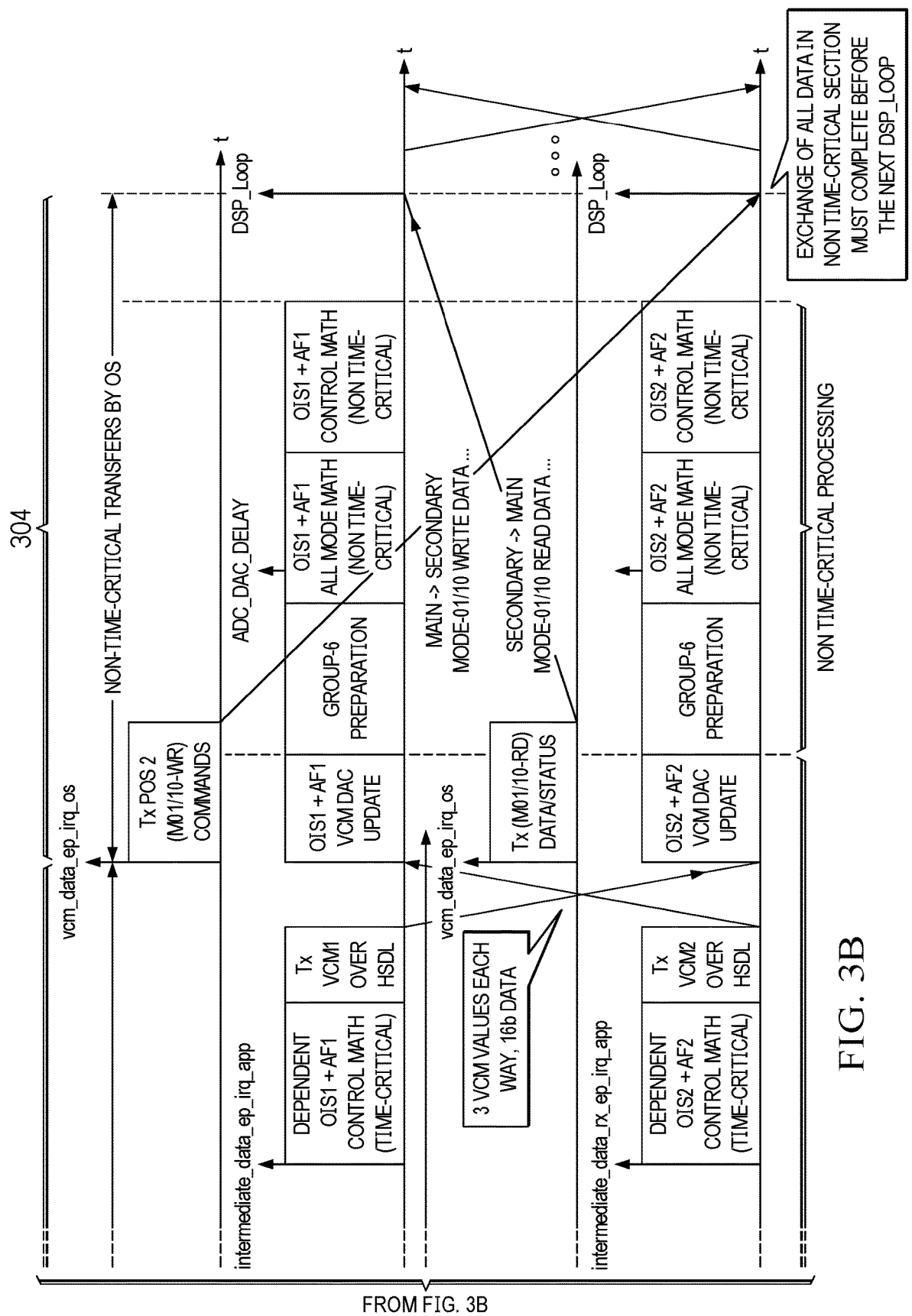

Having a dedicated bridge 208 for each core may significantly minimize arbitration by bus matrix 206, but may make the bus fabric of bus matrix 206 more complex and larger, which may negatively impact overall maximum clock speed of cores 202. To reduce or eliminate these disadvantages due to simultaneous access to shared peripheral 210 by cores 202, multicore processor 200 may include a software architecture configured to time partition access to shared peripheral 210 by cores 202. In this context, time partitioning may refer to partitioning communications transfers into non-overlapping segments of time, for example segments of time for time-critical transfers and segments of time for non-critical transfers. As a specific example, one core 202a may be an application core that manages peripheral interaction in time-critical segments, while an operating system core may manage peripheral interaction in non-critical time segments. FIG. 3 illustrates a timing diagram for time-partitioning of communications transfers from cores 202 to shared peripheral 210 between a time-critical segment of time 302 and a non-time critical segment of time 304, in accordance with embodiments of the present disclosure. Other time-partitioning techniques may include managing access by cores 202 to shared peripheral 210 in an interrupt with different periodicity between cores 202. While such time-partitioning techniques may not completely eliminate arbitration by bus matrix 206, such techniques may significantly minimize arbitration.

Although the foregoing contemplates use of a multicore processor in the context of a camera controller, it is understood that the systems and methods described herein may be applied to any suitable application.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A multicore processor comprising:
   a plurality of cores including at least a first core and a second core;
   a shared peripheral comprising a plurality of interrupt register banks including at least a first interrupt register bank dedicated to the first core and a second interrupt register bank dedicated to the second core; and
   a plurality of communications bridges, including at least a first bridge interfaced between the first core and the shared peripheral and at least a second bridge interfaced between the second core and the shared peripheral;

wherein:
the first core is configured to program the first interrupt register bank via the first bridge to configure the shared peripheral for access by the first core; and
the second core is configured to program the second interrupt register bank via the second bridge to configure the shared peripheral for access by the second core.

2. The multicore processor of claim 1, wherein the shared peripheral is configured to:
map a first interrupt request line to the first core in response to the first core programming the first interrupt register bank; and
map a second interrupt request line to the second core in response to the second core programming the second interrupt register bank.

3. The multicore processor of claim 1, wherein:
the first interrupt register bank includes a first static interrupt configuration for dynamically enabling and disabling of channel-data-based interrupts for the first core; and
the second interrupt register bank includes a second static interrupt configuration for dynamically enabling and disabling of channel-data-based interrupts for the second core.

4. The multicore processor of claim 1, wherein:
the first interrupt register bank includes a first static interrupt configuration for enabling and disabling of endpoint-based interrupts for the first core; and
the second interrupt register bank includes a second static interrupt configuration for enabling and disabling of endpoint-based interrupts for the second core.

5. The multicore processor of claim 1, further comprising a bus matrix serving as an interface among the plurality of cores and the plurality of communications bridges.

6. The multicore processor of claim 1, further comprising a software architecture configured to time partition access to the shared peripheral by the plurality of cores.

7. The multicore processor of claim 1, further comprising including software architecture configured to time partition, between time-critical segments of time and non-time critical segments of time, access to the shared peripheral by the plurality of cores.

8. The multicore processor of claim 1, wherein the plurality of cores are configured to, based on interrupt configuration settings and a configuration control mode, dynamically reassign an interrupt for one core of the plurality of cores to a subset of one or more other cores of the plurality of cores in order to load balance interrupts.

9. A method, for a multicore processor having a plurality of cores including at least a first core and a second core, a shared peripheral comprising a plurality of interrupt register banks including at least a first interrupt register bank dedicated to the first core and a second interrupt register bank dedicated to the second core, and a plurality of communications bridges, including at least a first bridge interfaced between the first core and the shared peripheral and at least a second bridge interfaced between the second core and the shared peripheral, the method comprising:
configuring the first core to program the first interrupt register bank via the first bridge to configure the shared peripheral for access by the first core; and
configuring the second core to program the second interrupt register bank via the second bridge to configure the shared peripheral for access by the second core.

10. The method of claim 9, further comprising:
mapping, by the shared peripheral, a first interrupt request line to the first core in response to the first core programming the first interrupt register bank; and
mapping, by the shared peripheral, a second interrupt request line to the second core in response to the second core programming the second interrupt register bank.

11. The method of claim 9, wherein:
the first interrupt register bank includes a first static interrupt configuration for dynamically enabling and disabling of channel-data-based interrupts for the first core; and
the second interrupt register bank includes a second static interrupt configuration for dynamically enabling and disabling of channel-data-based interrupts for the second core.

12. The method of claim 9, wherein:
the first interrupt register bank includes a first static interrupt configuration for enabling and disabling of endpoint-based interrupts for the first core; and
the second interrupt register bank includes a second static interrupt configuration for enabling and disabling of endpoint-based interrupts for the second core.

13. The method of claim 9, further comprising interfacing a bus matrix among the plurality of cores and the plurality of communications bridges.

14. The method of claim 9, further comprising time partitioning, with a software architecture, access to the shared peripheral by the plurality of cores.

15. The method of claim 9, further comprising time partitioning, with a software architecture, between time-critical segments of time and non-time critical segments of time, access to the shared peripheral by the plurality of cores.

16. The method of claim 9, further comprising, based on interrupt configuration settings and a configuration control mode, dynamically reassigning, by the plurality of cores, an interrupt for one core of the plurality of cores to a subset of one or more other cores of the plurality of cores in order to load balance interrupts.

\* \* \* \* \*